(12) United States Patent  
Ries

(10) Patent No.: US 9,129,447 B2  
(45) Date of Patent: Sep. 8, 2015

(54) METHOD AND DEVICE FOR GENERATING GRAPHIC IMAGES

(75) Inventor: Gilles Ries, Saint-Jean de Moirans (FR)

(73) Assignee: STMicroelectronics (Grenoble 2) SAS, Grenoble (FR)

(*) Notice: Subject to any disclaimer, the term of this patent is extended or adjusted under 35 U.S.C. 154(b) by 2088 days.

(21) Appl. No.: 12/133,150

(22) Filed: Jun. 4, 2008

(65) Prior Publication Data

US 2008/0303843 A1 Dec. 11, 2008

(30) Foreign Application Priority Data

Jun. 8, 2007 (FR) ...................................... 07 04098

(51) Int. Cl.
G09G 5/00 (2006.01)
G06T 15/80 (2011.01)

(52) U.S. Cl.
CPC ..................................... G06T 15/80 (2013.01)

(58) Field of Classification Search
USPC ................................................. 345/421, 629
See application file for complete search history.

(56) References Cited

U.S. PATENT DOCUMENTS

| | | | |
|---|---|---|---|
| 5,001,470 A | 3/1991 | Bandai | |
| 5,136,664 A * | 8/1992 | Bersack et al. | 382/304 |
| 6,204,856 B1 * | 3/2001 | Wood et al. | 345/608 |
| 6,677,957 B2 * | 1/2004 | Grzeszczuk et al. | 345/582 |
| 6,700,584 B1 * | 3/2004 | Wood | 345/581 |
| 6,717,576 B1 * | 4/2004 | Duluk et al. | 345/419 |
| 6,747,663 B2 * | 6/2004 | Oberoi et al. | 345/606 |
| 2003/0043171 A1 * | 3/2003 | Fliflet | 345/622 |
| 2003/0122819 A1 * | 7/2003 | Koneru et al. | 345/421 |
| 2003/0122850 A1 * | 7/2003 | Koneru et al. | 345/620 |
| 2003/0169252 A1 | 9/2003 | Pascual et al. | |
| 2007/0165035 A1 * | 7/2007 | Duluk et al. | 345/506 |

FOREIGN PATENT DOCUMENTS

WO  0011605  3/2000

OTHER PUBLICATIONS

Bhaniramka et al., "OpenGL Volumizer: A Toolkit for High Quality Volume Rendering of Large Data sets," Proceedings of the IEEE/ACM Siggraph Symposium on Volume Visualization and Graphics 2002, Boston, MA, Oct. 28-29, 2002, pp. 45-53.

* cited by examiner

Primary Examiner — M Good Johnson
(74) Attorney, Agent, or Firm — Seed IP Law Group PLLC

(57) ABSTRACT

A method generates an image from a set of image zones each delimited by a contour of polygonal shape defined by a set of vertexes, and comprising pixels having an attribute value which can be deduced from the value of a corresponding attribute of each of the vertexes of the image zone. The method includes determining to within a pixel the pixels that belong to each image zone according to the dimensions in number of pixels of the image to be generated; associating the pixels of each image zone in blocks of pixels; and determining an attribute value for each block of pixels of each image zone as a function of the value of the corresponding attribute of each vertex of the image zone.

20 Claims, 2 Drawing Sheets

METHOD AND DEVICE FOR GENERATING GRAPHIC IMAGES

BACKGROUND

1. Technical Field

Figure 1:
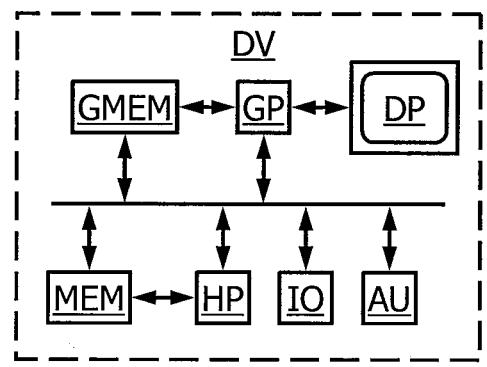

The present disclosure relates to the generation of graphic images by a computer, and in particular to the determination of the values of the pixels of such images.

2. Description of the Related Art

The present disclosure particularly applies to personal computers, game consoles, as well as to portable electronic objects such as mobile telephones and personal digital assistants (PDAs).

The generation of graphic images comprises processing operations which commonly involve mathematically modeling the interaction of light with a three-dimensional scene seen from a given observation point. These so-called "rendering" processing operations generate a two-dimensional image of the scene seen from the observation point. To obtain a quality of image equivalent to that of a photograph of a scene of the real world, and to meet strict real-time requirements, these processing operations generally use a specialized processing unit also referred to as a "graphic card or processor". Some graphic cards have an architecture enabling several operations to be performed in parallel.

The rendering processing operations are shared between the main processor (CPU) and the graphic processing unit of the computer. Classically, the main processor performs high level operations such as determining the position and the movement of objects in a scene and generates, from high level operations, rendering commands and graphic data giving a general description of a scene. From such commands and graphic data, the graphic processing unit produces one or more images that are stored in a frame memory containing images that are displayed on a screen.

A graphic processing unit particularly performs successive so-called "vertex", "rasterization", and then "fragment" processing operations. The vertex processing converts coordinates of object points in a two- or three-dimensional space, considered as vertexes of contours of image zones with polygonal contour (generally triangular), into coordinates of points in an image of the space seen by a user. The rasterization processing converts each image zone into sets of pixels called "fragments" comprising the coordinates in the image of all the pixels of the image zone and of the color and texture attributes associated with the vertexes of the image zone. The fragment processing particularly comprises determining characteristics or attributes, such as the color and the texture of each of the pixels of the fragment. The fragment processing supplies colors of pixels that are stored in a frame memory of a display device. Certain graphic processing units can be programmed to the point where programs implementing complex algorithms for illuminating and shading objects of a scene can be executed.

The fragment processing proves to be the most costly in computing time and power. It must indeed be executed on each image zone (or fragment) of each image to be generated. Now, an image that can be displayed at a frame frequency in the order of 30 frames per second can need several tens of millions of fragments to be processed per second. Furthermore, the definition, and therefore the number of pixels of the screens of portable devices such as mobile telephones tends to increase. Currently, these screens are close to the VGA format (640×480 pixels). In this case, the number of pixels to be calculated for each image is thus in the order of 300,000 pixels.

However, these portable devices do not have graphic processors as efficient as those of PCs. It is therefore desirable to reduce the computing time needed to process the fragments, while deteriorating the quality of the images as little as possible.

BRIEF SUMMARY

One embodiment is a method for generating an image from a set of image zones each being delimited by a contour of polygonal shape defined by a set of vertexes, and comprising pixels each having an attribute value which can be deduced from the value of a corresponding attribute of each of the vertexes of the image zone. The method includes determining to within a pixel the pixels that belong to each image zone as a function of the dimensions in number of pixels of the image to be generated. According to one embodiment, the method comprises steps of:

associating the pixels of each image zone in blocks of pixels, and determining an attribute value for each block of pixels of each image zone as a function of the value of the corresponding attribute of each vertex of the image zone.

According to one embodiment, the blocks of pixels of an image zone comprise at the most n lines of m pixels depending on whether or not the block of pixels is located on the contour of the image zone, n and m being integer numbers greater than or equal to 1.

According to one embodiment, the blocks of pixels of an image zone comprise at the most 2 lines of 2 pixels.

According to one embodiment, the method comprises steps of calculating a depth value for each pixel of each image zone as a function of a depth value of each of the vertexes of the image zone, and of determining the pixels of each image zone contained in the image to be generated as a function of the depth value of each of the pixels of each of the image zones.

According to one embodiment, the contour of the image zones is triangular.

One embodiment also relates to a processor configured for:

generating an image from a set of image zones each being delimited by a contour of polygonal shape defined by a set of vertexes, and comprising pixels having an attribute value which can be deduced by interpolation from the value of a corresponding attribute of each of the vertexes of the image zone, and determining to within a pixel the pixels that belong to each image zone as a function of the dimensions in number of pixels of the image to be generated.

According to one embodiment, the processor is configured for:

associating the pixels of each image zone in blocks of pixels, and determining an attribute value for each block of pixels of each image zone as a function of the value of the corresponding attribute of each vertex of the image zone.

According to one embodiment, the blocks of pixels of an image zone comprise at the most n lines of m pixels depending on whether or not the block of pixels is located on the contour of the image zone, n and m being integer numbers greater than or equal to 1.

According to one embodiment, the blocks of pixels of an image zone comprise at the most 2 lines of 2 pixels.

According to one embodiment, the processor is configured for calculating a depth value for each pixel of each image zone as a function of a depth value of each of the vertexes of the image zone, and determining the pixels of each image zone contained in the image to be generated as a function of the depth values of the pixels.

According to one embodiment, the contour of the image zones is triangular.

One embodiment also relates to a portable electronic object, comprising a processor as defined previously.

BRIEF DESCRIPTION OF THE SEVERAL VIEWS OF THE DRAWING(S)

Figure 2:
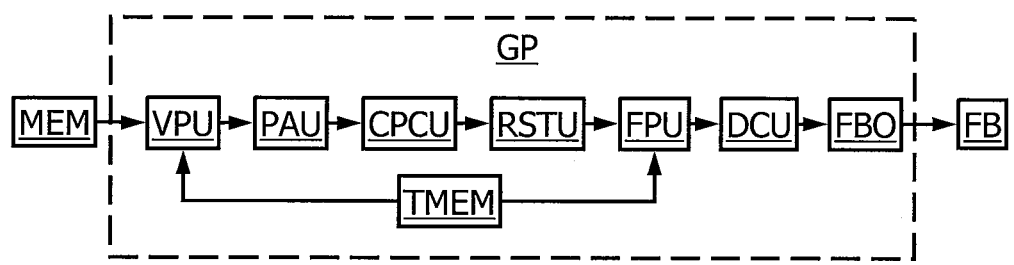
Figure 3A:
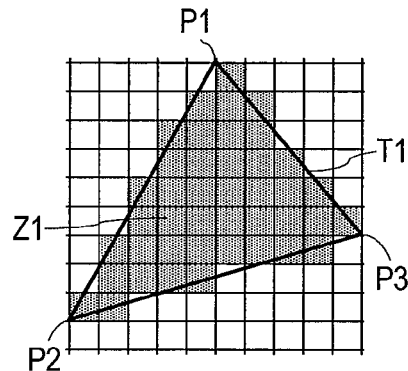
Figure 3B:
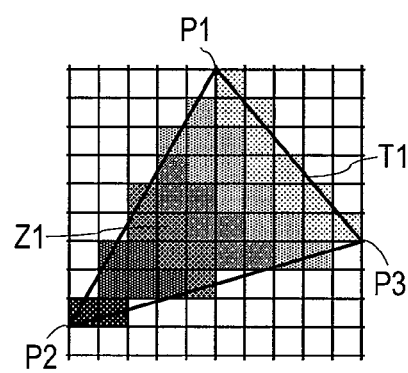
Figure 3C:
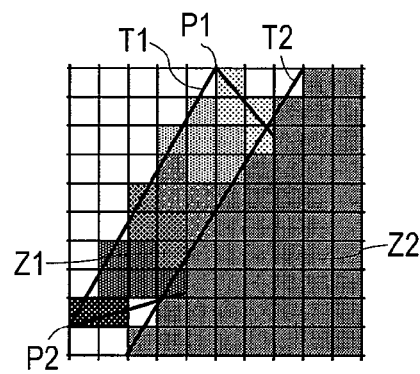
Figure 4:
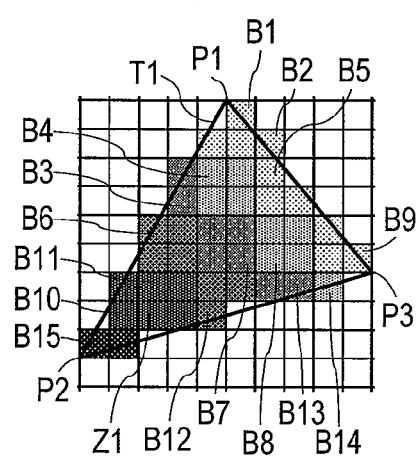

Examples of implementation are described below. These examples are described in relation with, but not limited to the following figures, in which:

FIG. 1 represents in block form an example of calculator architecture capable of implementing a method according to one embodiment, FIG. 2 is a view in block form of an example of architecture of a graphic processing unit represented in FIG. 1, FIGS. 3A to 3C are views of a set of pixels showing an example of a method for generating graphic images, according to prior art, FIG. 4 is a view of a set of pixels showing fragment processing according to an example of an embodiment.

DETAILED DESCRIPTION

FIG. 1 represents an example of a computer adapted to the implementation of a method for generating graphic images. The computer comprises a processor HP, memories MEM, input/output interfaces IO, a graphic image generating unit GP connected to a graphic memory GMEM and to a screen DP, and a sound generating unit AU connected to one or more loudspeakers. A bus connects the processor HP, the memories MEM, GMEM, the unit GP, the unit AU and the interfaces IO to one another.

The memories MEM may comprise RAM-type volatile memories and EEPROM- or FLASH-type non-volatile memories. The input/output interfaces may comprise one or more interface units for connection to a communication network (mobile network, WIFI, Ethernet), and one or more external bus interface units (I2C, SPI, IrDA, USB, etc.).

FIG. 2 represents an example of the graphic image generating unit GP, configured between the memory MEM and a frame memory FB. The unit GP comprises a vertex processing unit VPU, a vertex assembling unit PAU, a displayed zone selecting unit CPCU, a pixel location unit RSTU, a fragment generating unit (image zones) FPU, an object depth processing unit DPU and an image pixel generating unit FBO.

The unit VPU processes a collection of objects defined by image zones of homogenous color or texture, to place the objects in a three-dimensional scene. The objects to be processed are stored in one of the memories MEM and are defined in a specific repository by image zones each being delimited by a polygonal contour determined by the positions of the vertexes of the contour. The unit VPU calculates the coordinates of the vertexes of the contours of zones in a repository linked to a three-dimensional scene and calculates axes of illumination of the objects as a function of positions of light sources. The unit VPU projects the three-dimensional scene onto a plane corresponding to the scene seen by a user. For this purpose, the unit VPU calculates the coordinates of the vertexes in the plane. The contours of the image zones are for example of triangular shape, therefore with three vertexes.

The unit PAU groups together the vertexes located in the plane into image zones. The unit CPCU delimits a display zone in the plane of the scene seen by the user. All the image zones outside the display zone are therefore removed. All the image zones straddling the edge of the display zone are cut again to remove the portions of the image zones outside the display zone. The unit CPCU then determines a transform to be applied to the objects of the scene to obtain a perspective effect. The unit CPCU then applies a transform to the coordinates of the vertexes to obtain the position of the vertexes in the screen. This transform of coordinates takes the screen resolution into account, i.e., the number of pixels in width and height in an image displayed by the screen. The unit CPCU then removes the image zones that should not be displayed, i.e., those that are situated on the rear faces of the objects of the scene.

The unit RSTU locates the pixels of each image zone in the image to be displayed as a function of the coordinates of the pixels of the vertexes of the image zone. The unit FPU determines the color and the texture of each pixel, determined by the unit RSTU, of each image zone. The unit DCU selects the image zones and the portions of image zone to be displayed as a function of their depth and their position in relation to those of the other image zones. The unit DCU also applies a correction to the value of the pixels of each image zone to take into account the shadow cast by the objects of the scene on the other objects. The pixels calculated by the unit DCU are transferred by the unit FBO taking into account a transparency coefficient allocated to each of the objects of the scene.

Furthermore, the units VPU and FPU access a texture memory zone TMEM in which textures are stored on which vertexes processed by the unit VPU point. When a vertex to be processed is associated with a pointer towards a texture of the memory area TMEM, the unit FPU accesses the texture towards which the vertex points to determine the color of each of the pixels of the image zones whose vertex is the vertex to be processed.

FIGS. 3A to 3C show the processing operations performed by the rasterization RSTU, fragment FPU and depth processing DCU units. FIG. 3A represents three vertexes P1, P2, P3 defining a contour T1 of image zone Z1 of triangular shape. The triangle T1 is represented overprinted on a grid representing the pixels of a zone of the screen. The unit RSTU determines the pixels that are considered to belong to the image zone Z1 delimited by the triangle T1. The pixels belonging to the image zone Z1 appear in grey in FIG. 3A.

FIG. 3B shows the processing performed by the unit FPU, according to prior art. From the color and texture characteristics of the pixels of the vertexes P1, P2, P3 of the image zone Z1, the unit FPU individually determines the color and the texture of each of the pixels belonging to the zone Z1. For this purpose, the unit FPU uses a function applied to the values (color, texture) of the pixels of the vertexes P1, P2, P3 and to the distances (in number of pixels) between the pixel to be calculated and each of the vertexes. The function used to determine the values of the pixels can be an interpolation function, for example of linear type. Therefore, the color of each pixel of the zone Z1, represented in grey levels in FIG. 3B, can be different from that of each of the adjacent pixels.

FIG. 3C shows the processing performed by the unit DCU. This processing involves, for each image zone Z1 of the image to be generated, determining (for example by interpolation) a depth value for each of the pixels as a function of a depth value allocated to each of the vertexes P1, P2, P3 of the image zone, and determining the portions of the image zones to be displayed in the image to be generated as a function of the depth value of each of the pixels of each image zone, i.e., those that are not hidden by other image zones having a lower depth. In the example in FIG. 3C, a portion of the image zone Z1 is hidden by an image zone Z2 delimited by a contour T2, the pixels of which have a depth lower than the depth of the pixels of the zone Z1.

The processing performed by the unit FPU proves to be very costly in computing time, as the latter increases with the number of pixels of the images to be generated, i.e., of the screen.

According to one embodiment, the pixels of the image to be generated are grouped together into blocks of n×m pixels, n and m being integer numbers greater than or equal to 1. The processing performed by the unit FPU determines the color and the texture, not of the pixels individually, but of the blocks of pixels belonging to each image zone Z1. The edges of the image zones Z1 remain determined to within a pixel.

FIG. 4 shows the processing performed by the unit FPU according to an example of an embodiment. In the example in FIG. 4A, the pixels of the zone Z1 are grouped together in blocks of 2×2 pixels. Each block of pixels of the zone Z1 in question comprises for example the pixels of the zone Z1 having the following coordinates in the final image: (2i, 2j), (2i+1, 2j), (2i, 2j+1), (2i+1, 2j+1), i and j being integer numbers varying within limits defined as a function of the configuration and to the size of the zone Z1 in the image to be generated. Therefore, the zone Z1 comprises blocks B1 to B15. As the edge of the zone remains determined to within a pixel, certain blocks located on the edge of the zone Z1 have less than four pixels. Thus, the block B1 for example, only comprises three pixels and the block B2 a single pixel. From the color and texture characteristics of the pixels of the vertexes P1, P2, P3 of the image zone Z1, the unit FPU determines, using an interpolation function, for example an interpolation function allocated to the zone Z1, the color and the texture of each of the blocks of pixels belonging to the image zone Z1. Therefore, all the pixels of each block of pixels belonging to the zone Z1 have a single color (represented in grey levels).

Therefore, in the final image obtained in the frame memory FB, the contours are defined to within a pixel, while the distribution of the colors and textures is defined to within a block of pixels. If for example, each image generated is in the VGA format (640×480 pixels), the quantity of calculations used to determine the colors and textures of the pixels of each image zone corresponds to that of the QVGA format (320× 240 pixels) if the pixels are associated in blocks of 2×2 pixels.

As the contours of the objects presented in an image are more visible than the variations in color or texture levels of these objects, the image obtained has a quality that is very little degraded in appearance compared to an image the pixels of which are calculated individually.

The image thus generated is then processed by the unit DCU on a pixel-by-pixel basis as described previously with reference to FIG. 3C.

It will be understood that at least a part of the processing performed by the unit DCU can be done before the processing performed by the unit FPU to reduce the processing operations. For this purpose, only the pixels of the portions of image zones actually displayed are determined by the unit FPU.

The implementation changes only the processing used to calculate the color and texture of the image zones, performed by the unit FPU so that it can be applied not to each pixel, but to each block of pixels. The computing time used by the unit FPU is substantially divided by four in the case of blocks of pixels sized 2×2. In other words, the method described above enables the computing power required of the unit FPU to be divided by a factor 4.

Related to all of the processing operations performed by the image generating unit GP, the method enables a gain approximately in the order of a factor 2 in terms of necessary computing power or of processing time (in the case of blocks of pixels of 2×2 pixels).

It will be understood by those skilled in the art that various alternative embodiments and applications of the present invention are possible. In particular, the present invention is not limited to grouping the pixels into blocks of 2×2 pixels. An embodiment can be implemented by grouping together the pixels more generally into blocks of n×m pixels, n and m being integer numbers greater than or equal to 1, and not necessarily identical. It is thus possible to consider grouping together the pixels for example into blocks of 2×1 or 1×2 pixels, or into blocks of 4×4 pixels.

Further, the invention is not limited to the processing of the color of the pixels, and various embodiments can process any other pixel attribute that can be deduced from the corresponding attributes of the vertexes of the polygon where the pixel is located.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
generating an image from a set of image zones each being delimited by a contour of polygonal shape defined by a set of vertexes, each image zone including pixels having an attribute value which can be deduced from a value of a corresponding attribute of each of the vertexes of the image zone, the generating including:
determining, to within a pixel, the pixels that belong to each image zone as a function of dimensions, in number of pixels, of the image to be generated,
associating the pixels of each image zone in blocks, at least some of the blocks of each image zone including plural pixels, and
determining an attribute value for each block of pixels of each image zone as a function of the value of the corresponding attribute of each vertex of the image zone.

2. The method according to claim 1, wherein the blocks of pixels of each image zone comprise at the most n lines of m pixels depending on whether or not the block of pixels is located on the contour of the image zone, n and m being integer numbers greater than or equal to 1.

3. The method according to claim 1, wherein the blocks of pixels of an image zone comprise at the most 2 lines of 2 pixels.

4. The method according to claim 1, comprising calculating a depth value for each pixel of each image zone as a function of a depth value of each of the vertexes of the image zone, and determining which pixels of the image zones to include in the image as a function of the depth value of each of the pixels of each of the image zones.

5. The method according to claim 1, wherein the contour of the image zones is triangular.

6. A processor, comprising:
generating means for generating an image from a set of image zones each being delimited by a contour of polygonal shape defined by a set of vertexes, the image zones each including pixels having an attribute value which can be deduced by interpolation from a value of a corresponding attribute of each of the vertexes of the image zone, the generating means including:
first determining means for determining, to within a pixel, the pixels that belong to each image zone as a function of dimensions, in number of pixels, of the image,
associating means for associating the pixels of each image zone in blocks, at least some of the block of each image zone including plural pixels, and
second determining means for determining an attribute value for each block of pixels of each image zone as a function of the value of the corresponding attribute of each vertex of the image zone.

7. The processor according to claim 6, wherein the blocks of pixels of each image zone comprise at the most n lines of m pixels depending on whether or not the block of pixels is located on the contour of the image zone, n and m being integer numbers greater than or equal to 1.

8. The processor according to claim 6, wherein the blocks of pixels of each image zone comprise at the most 2 lines of 2 pixels.

9. The processor according to claim 6, wherein the first generating means includes:
calculating means for calculating a depth value for each pixel of each image zone as a function of a depth value of each of the vertexes of the image zone, and
third determining means for determining which pixels of the image zones to include in the image as a function of the depth values of the pixels.

10. The processor according to claim 6, wherein the contour of the image zones is triangular.

11. A portable electronic device, comprising:
a display configured to display an image; and
a graphic image generating unit configured to generate an image from a set of image zones each being delimited by a contour of polygonal shape defined by a set of vertexes, the image zones each including pixels having an attribute value which can be deduced by interpolation from a value of a corresponding attribute of each of the vertexes of the image zone, the generating unit including:
a pixel locating unit configured to determine, to within a pixel, the pixels that belong to each image zone as a function of dimensions, in number of pixels, of the image;
a fragment generating unit configured to associate the pixels of each image zone in blocks, at least some of the block of each image zone including plural pixels; and
an attribute unit configured to determine an attribute value for each block of pixels of each image zone as a function of the value of the corresponding attribute of each vertex of the image zone.

12. The device according to claim 11, wherein the blocks of pixels of each image zone comprise at the most n lines of m pixels depending on whether or not the block of pixels is located on the contour of the image zone, n and m being integer numbers greater than or equal to 1.

13. The device according to claim 11, wherein the blocks of pixels of each image zone comprise at the most 2 lines of 2 pixels.

14. The device according to claim 11, wherein the generating unit includes:
an object depth calculating unit configured to:
calculate a depth value for each pixel of each image zone as a function of a depth value of each of the vertexes of the image zone, and
determine which pixels of the image zones to include in the image as a function of the depth values of the pixels.

15. The device according to claim 11, wherein the contour of the image zones is triangular.

16. A processing device, comprising:
a pixel locating unit configured to determine, to within a pixel, pixels that belong to each image zone in a set of image zones used to generate an image, as a function of dimensions, in number of pixels, of the image; and
a fragment generating unit coupled to the pixel locating unit and configured to associate the pixels of each image zone in blocks, at least some of the block of each image zone including plural pixels, and determine an attribute value for each block of pixels of each image zone as a function of the value of the corresponding attribute of each vertex of the image zone.

17. The processing device according to claim 16, wherein the blocks of pixels of each image zone comprise at the most n lines of m pixels depending on whether or not the block of pixels is located on the contour of the image zone, n and m being integer numbers greater than or equal to 1.

18. The processing device according to claim 16, wherein the blocks of pixels of each image zone comprise at the most 2 lines of 2 pixels.

19. The processing device according to claim 16, further comprising:
an object depth processing unit coupled to the fragment generating unit and configured to calculate a depth value for each pixel of each image zone as a function of a depth value of each of the vertexes of the image zone, and determine which pixels of the image zones to include in the image as a function of the depth values of the pixels.

20. The processing device according to claim 16, wherein the contour of the image zones is triangular.

* * * * *